May 17, 1949.  E. A. STALKER  2,470,729
GAS TURBINE POWER PLANT
Filed May 14, 1947

INVENTOR.
Edward A. Stalker

Patented May 17, 1949

2,470,729

UNITED STATES PATENT OFFICE 2,470,729

GAS TURBINE POWER PLANT

Edward A. Stalker, Bay City, Mich.

Application May 14, 1947, Serial No. 748,097

4 Claims. (Cl. 60—41)

My invention relates to power plants of the type which incorporate an internal combustion turbine, commonly called a gas turbine. In particular my invention relates to a novel relationship between a gas turbine and a novel heat recovery unit therefor.

It is an object of my invention to provide a regenerator adapted to utilize very high temperature exhaust gas from a high temperature gas turbine.

Another object is to provide an efficient means of cooling parts of a gas turbine.

Other objects will appear from the description, drawings and claims.

In my pending application Serial No. 510,884 filed November 19, 1943, I have disclosed means of operating gas turbines at elevated temperatures which necessarily exhaust the gases at such high temperatures that it would be impractical to pass these gases directly through a regenerator to recover their heat. It would however greatly increase the fuel economy of such a gas turbine if the heat of the exhaust could be used in a regenerator to heat the compressed air or fluid entering the combustion chamber or turbine.

In applications where such a regenerator would find use the length of its life is important and largely dependent upon the wall temperature of its parts. Hence it is desirable to keep the temperature of the wall as low as possible while transmitting heat from the hot exhaust gas to the motive air or fluid.

The above objects are accomplished by the means illustrated in the accompanying drawings in which—

Figure 1:
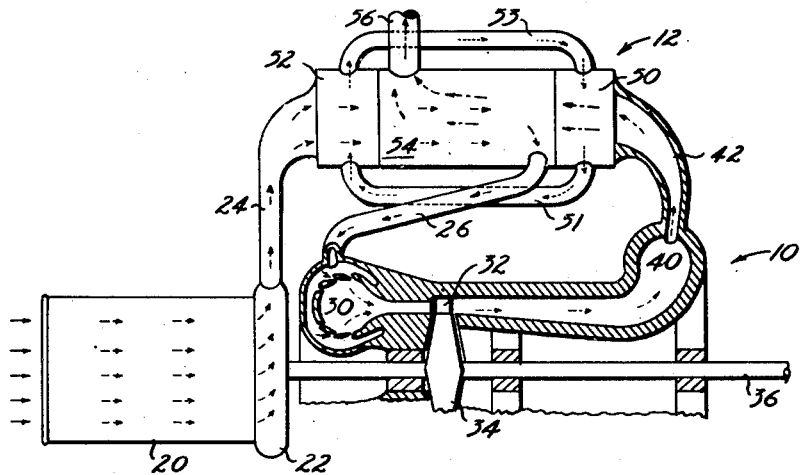
Figure 2:
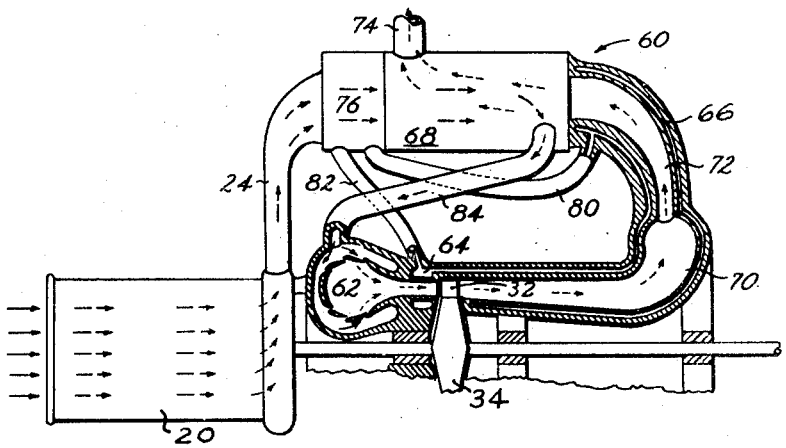

Figure 1 is a fragmentary axial section through a gas turbine shown in relation to a regenerator; and Figure 2 is a fragmentary section through another turbine shown in relation to its regenerator.

Referring now to the drawings the turbine in Fig. 1 shown as an upper portion is indicated generally as 10. It is connected by suitable ducting to a heat recovery unit generally designated as 12.

The compressor of the turbine is 20. It discharges compressed air into the collector 22 whence by duct 24 it passes into the heat recovery unit 12. From it via duct 26 the air which has been preheated passes to the heating chamber 30 where the air is further heated. From the heating chamber the fluid, to be herein called the gas, impinges upon the blades 32 of the turbine rotor 34 mounted on shaft 36.

The exhaust gas is collected in the volute collector 40 and conducted by duct 42 to the unit 12. This exhaust gas supplies the heat to the unit for heating the compressed air and is conveniently called the heating gas.

The turbine is operated at a very high temperature and consequently the exhaust gas is also at a very high temperature, so high in fact that the life of a simple regenerator would be too short.

In order to conserve the life of the unit the exhaust gas first enters a heat exchanger 50 where the temperature of the exhaust gas is reduced by giving up some of its heat through the exchanger walls to the liquid on the other side of these walls. This liquid flows via pipe 51 to the heat exchanger 52 where it heats the compressed air entering. The liquid returns to exchanger 52 via duct 53.

The exhaust gas flows from the exchanger 50 into the regenerator 54 where heat is transferred to the compressed air coming from exchanger 52. The exhaust gas escapes through pipe 56 while the compressed air enters duct 26.

In other words the exhaust gas is too hot to pass directly into the regenerator where the heat would be conducted through a wall directly to the compressed air. That is, the temperature dealt with is too high for gas to gas heat exchange, calling the air a gas for the moment. However the temperature is not too high for a gas to liquid exchange, and this takes place in liquid exchanger 50 so that the exhaust gas is prepared for use in the regenerator. In the same instance the heat abstracted is conserved by giving it up to the compressed air just before entering the regenerator. By this arrangement the life of the heat recovery unit is greatly extended and adapted to the use of high temperature exhaust gas.

In another form of the invention, Fig. 2, the compressor delivers compressed air as before to a heat recovery unit 60 which serves a turbine similar to the turbine of Fig. 1 except that certain parts of the machine are jacked for use of a cooling liquid.

Thus the combustion chamber 62 at the exit end has the jacket 64 in communication with the jacket 66 surrounding the walls of the passages 70 and 72 conducting the exhaust gas to the regenerator 68 from which it escapes through pipe 74.

The fluid in the jackets is conducted to the heat exchanger 76 by duct 80 and returned by duct 82.

The compressed air is directed to the exchanger 76 by the duct 24 and to the combustion chamber by duct 84.

The jacketing of the parts of the turbine conserves them by keeping the wall temperature at a sufficiently low value. In addition, the jacketing of the exhaust ducts reduces the temperature of the exhaust gas flowing within. The reduction of temperature can be carried to the extent that the gases are suitable for introduction to the regenerator 68.

The liquids employed in the liquid heat exchangers may be any type of material, for instance water, mercury, other metals or alloys, orthodichlorobenzene, tetracresylsilicate, and the like.

In the heat recovery units such as 12 and 60 the liquid containing heat exchangers such as 50, 52 and 76 can be called entrance units since each admits a fluid for flow into their respective regenerators 54 and 68.

To recapitulate the invention provides a means of using a regenerator with a turbine operating at a very high temperature so that the exhaust gas is also high in temperature. The exhaust gas before entering the regenerator is passed through a cooling means such as an exhaust gas heat exchanger employing a liquid to abstract the heat from the gas. The liquid carries the heat to a heat exchanger to put the heat into the motive gas or air for the turbine. The gas or air is warmed some in the heat exchanger and then flows into the regenerator where it is heated by the exhaust gas flowing therethrough from the exhaust gas heat exchanger. The exhaust gas is cool enough in the renegerator not to reduce its life unduly.

All of the heat exchangers operate in out-of-contact heat exchange relation.

While I have described special forms of apparatus incorporating my invention it is to be understood that I do not intend to limit myself to these exact forms but intend to claim my invention broadly as indicated in the appended claims.

I claim:

1. In combination, a liquid-containing high temperature heat exchanger, a liquid-containing low temperature heat exchanger, means connecting said liquid exchangers in series for the flow of liquid from one to the other to convey heat therebetween, a gas regenerator, means to direct motive fluid through said low temperature exchanger and said regenerator in succession to heat said motive fluid, and means to direct heating gas through said high temperature exchanger and said regenerator in succession to heat said liquid and said motive fluid flowing through said regenerator.

2. In combination, a liquid-containing high temperature heat exchanger, a liquid-containing low temperature heat exchanger, means connecting said liquid exchangers in circuit for the circuitous flow of liquid therebetween, a gas regenerator, means to direct motive fluid through said low temperature exchanger and said regenerator in said order so that said motive fluid receives heat, and means to direct heating gas through said high temperature exchanger and said regenerator in said order to reduce said heating gas temperature before its entrance into said regenerator, said heating gas heating said liquid, said heating gas flowing into and through said regenerator to transfer heat to said motive fluid.

3. In combination, a gas turbine having a wall to be cooled, a liquid-containing heat exchanger, duct means forming a circuit for the conduction of a flow of liquid along said wall to said exchanger, said flow receiving heat from said wall and delivering it to said exchanger, a regenerator, means to conduct exhaust gas from said gas turbine to said regenerator, and means to conduct a motive fluid through said heat exchanger and said regenerator in succession to the inlet of said turbine to preheat said motive fluid, and other means to heat said motive fluid enroute from said regenerator to said inlet.

4. In combination, a liquid-containing high temperature heat exchanger, a liquid-containing low temperature heat exchanger, means connecting said liquid exchangers in series for the flow of liquid from one to the other to convey heat therebetween, a gas turbine having an inlet to receive fluid and an exit to discharge exhaust gas, a gas regenerator, means to direct motive fluid through said low temperature exchanger and said regenerator in succession to said inlet to heat said motive fluid enroute, and means to direct exhaust gas from said turbine through said high temperature exchanger and said regenerator in succession to heat said liquid and said motive fluid flowing through said regenerator to said turbine.

EDWARD A. STALKER.

REFERENCES CITED

The following references are of record in the file of this patent:

FOREIGN PATENTS

| Number | Country | Date |
|--------|---------|------|
| 439,805 | Great Britain | Dec. 6, 1935 |
| 648,878 | Germany | Aug. 11, 1937 |